(12) United States Patent
Fujisawa et al.

(10) Patent No.: US 12,479,135 B2
(45) Date of Patent: Nov. 25, 2025

(54) RESIN-SEALING METHOD

(71) Applicant: Yamaha Robotics Co., Ltd., Tokyo (JP)

(72) Inventors: Masahiko Fujisawa, Nagano (JP); Shinichi Asahi, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 15 days.

(21) Appl. No.: 18/694,995

(22) PCT Filed: Nov. 26, 2021

(86) PCT No.: PCT/JP2021/043339
§ 371 (c)(1),
(2) Date: Mar. 25, 2024

(87) PCT Pub. No.: WO2023/095275
PCT Pub. Date: Jun. 1, 2023

(65) Prior Publication Data
US 2024/0416561 A1 Dec. 19, 2024

(51) Int. Cl.
*B29C 43/36* (2006.01)
*B29C 43/58* (2006.01)

(52) U.S. Cl.
CPC ........... *B29C 43/361* (2013.01); *B29C 43/58* (2013.01); *B29C 2043/5833* (2013.01)

(58) Field of Classification Search
None
See application file for complete search history.

(56) References Cited

U.S. PATENT DOCUMENTS

2013/0270730 A1    10/2013   Kawachi et al.

FOREIGN PATENT DOCUMENTS

| JP | 2000 252 311 A | * | 9/2000 |
| JP | 2000252311 | | 9/2000 |

(Continued)

OTHER PUBLICATIONS

"International Search Report (Form PCT/ISA/210) of PCT/JP2021/043339", mailed on Dec. 28, 2021, with English translation thereof, pp. 1-4.

(Continued)

*Primary Examiner* — Mohammad M Ameen
(74) *Attorney, Agent, or Firm* — JCIPRNET

(57) ABSTRACT

A resin-sealing method for resin-sealing an electronic component using a mold-clamping apparatus provided with raising-lowering mechanisms including a first raising-lowering mechanism and a second raising-lowering mechanism includes steps below. A resin-sealed product obtained by resin-sealing is measured to measure a total thickness variation which is a difference between a maximum value and a minimum value of a thickness. A height difference between a first part of a movable platen corresponding to the first raising-lowering mechanism and a second part of the movable platen corresponding to the second raising-lowering mechanism is determined such that the total thickness variation becomes smaller. The first raising-lowering mechanism and the second raising-lowering mechanism are driven such that the first part and the second part form the height difference. Mold clamping is performed in a state maintaining the height difference.

6 Claims, 4 Drawing Sheets

(56) References Cited

FOREIGN PATENT DOCUMENTS

| JP | 2007 324 377 A | * | 12/2007 |
|----|----------------|---|---------|
| JP | 2007324377 | | 12/2007 |
| JP | 2008087408 | | 4/2008 |
| JP | 2013 220 550 A | * | 10/2013 |
| JP | 2013220550 | | 10/2013 |

OTHER PUBLICATIONS

"Office Action of Taiwan Counterpart Application", issued on Apr. 26, 2023, with English translation thereof, p. 1-p. 7.

* cited by examiner

RESIN-SEALING METHOD

CROSS-REFERENCE TO RELATED APPLICATION

This application is a 371 application of the International PCT application serial no. PCT/JP2021/043339, filed on Nov. 26, 2021. The entirety of the above-mentioned patent application is hereby incorporated by reference herein and made a part of this specification.

TECHNICAL FIELD

The present invention relates to a molding-clamping apparatus including a plurality of raising-lowering mechanisms.

RELATED ART

There is a desire to minimize a total thickness variation (TTV), which is a difference between a maximum value and a minimum value of the thickness of a resin-sealed product. To reduce the TTV, it is required to precisely adjust the distance between a fixed platen and a movable platen during molding clamping such that an upper mold and a lower mold are arranged in parallel. For example, Patent Document 1 and Patent Document 2 propose a molding-clamping apparatus that includes a plurality of raising-lowering mechanisms and is capable of adjusting the height of the movable platen in any manner at each part corresponding to the respective raising-lowering mechanism.

RELATED ART DOCUMENTS

Patent Documents

Patent Document 1: Japanese Patent Application Laid-Open No. 2007-324377
Patent Document 2: Japanese Patent Application Laid-Open No. 2008-087408

SUMMARY OF INVENTION

Problem to be Solved by Invention

The apparatuses described in Patent Document 1 and Patent Document 2 both constantly monitor detected values by a pressure detection means, and based on the detected values, the servo motor of the raising-lowering mechanism is controlled such that the applied pressure becomes uniform. However, the detected values detected while driving the raising-lowering mechanism include errors due to disturbances. The conventional method of feeding back the detected values to the control of the servo motor in real time may not be suitable for production of high-precision resin-sealed products because there may be disturbances depending on the installation environment of the apparatus. Thus, an objective of the present invention is to provide a resin-sealing method capable of producing high-precision resin-sealed products.

Means for Solving Problem

An embodiment of the present invention is a method for resin-sealing an electronic component using a mold-clamping apparatus provided with a plurality of raising-lowering mechanisms including a first raising-lowering mechanism and a second raising-lowering mechanism. The method includes step below. A resin-sealed product obtained by resin-sealing is measured to measure a TTV which is a difference between a maximum value and a minimum value of a thickness. A height difference between a first part of a movable platen corresponding to the first raising-lowering mechanism and a second part of the movable platen corresponding to the second raising-lowering mechanism is determined such that the TTV becomes smaller. The first raising-lowering mechanism and the second raising-lowering mechanism are driven such that the first part and the second part form the determined height difference. Mold clamping is performed in a state maintaining the height difference.

According to this embodiment, it is possible to provide a resin-sealing method capable of producing high-precision resin-sealed products with a small TTV.

In the above embodiment, in the determining the height difference, a first thickness of the resin-sealed product resin-sealed at a position corresponding to the first part is compared with a second thickness of the resin-sealed product resin-sealed at a position corresponding to the second part. In a case where the first thickness is larger than the second thickness by a first difference, the height difference may be determined such that a movement amount of mold clamping increases by the first difference at the first part, or the height difference may be determined such that a movement amount of mold clamping decreases by the first difference at the second part. Alternatively, the height difference may be determined such that a movement amount of mold clamping increases by a portion of the first difference at the first part, and a movement amount of mold clamping decreases by a remainder of the first difference at the second part.

According to this embodiment, it is possible to determine a height difference with which the TTV becomes smaller by a simple procedure based on a difference in thicknesses. When the position corresponding to the first part is thicker than the position corresponding to the second part, the position corresponding to the first part may be thinned to eliminate the difference, or the position corresponding to the second part may be thickened to eliminate the difference. It is also possible to combine these methods to eliminate the difference.

In the above embodiment, the measuring the TTV, the determining the height difference, the driving, and the performing mold clamping in a state maintaining the height difference may be repeated until a predetermined condition is satisfied.

According to this embodiment, it is possible to produce high-precision resin-sealed products with an extremely small TTV. Satisfying the predetermined condition may mean that the variation amount of the TTV, which decreases gradually, becomes at or below a threshold, may mean that the TTV becomes at or below a threshold, or may mean that regardless of the TTV, the count of tests reaches a specified count.

In the above embodiment, the method may further include steps below. The height difference that satisfies the predetermined condition is determined in a state in which a first mold is attached to the mold-clamping apparatus. The height difference satisfying the predetermined condition is stored. The stored height difference is read out in a case where the first mold is attached again to the mold-clamping apparatus.

According to this embodiment, the plurality of raising-lowering apparatuses including the first raising-lowering apparatus and the second raising-lowering apparatus reproduce the height difference that satisfies the predetermined condition at the time of mold exchange. Since it is not required to repeat tests and insert a shim at each mold exchange to adjust the mold, or repeat tests to determine the height difference of the movable platen, it is possible to reduce the burden of an operator.

In the above embodiment, the mold-clamping apparatus may have an apparatus ID unique to the apparatus, and the first mold may have a mold ID unique to the mold. In a case where the first mold is attached again to the mold-clamping apparatus, by collating a combination of the apparatus ID and the mold ID, the height difference associated with the combination may be read out.

According to this embodiment, since the height difference associated with the combination of the apparatus ID and the mold ID is automatically read out at the time of mold exchange, it is possible to reduce the burden of the operator compared to the case of operating an operation panel or the like to manually read out the value. It is possible to prevent occurrence of human errors resulting from the operator's operation.

In the above embodiment, the mold-clamping apparatus may be provided with four raising-lowering mechanisms including the first raising-lowering mechanism and the second raising-lowering mechanism.

According to this embodiment, a plurality of raising-lowering mechanisms may be combined to tilt the movable platen in various directions. For example, viewed from the front, the movable platen may be tilted upward on the left by raising the raising-lowering mechanisms on the left-front and left-rear sides more than the other raising-lowering mechanisms, or the movable platen may be tilted upward on the front by raising the raising-lowering mechanisms on the left-front and right-front sides more than the other raising-lowering mechanisms.

Effect of Invention

According to the present invention, it is possible to provide a resin-sealing method capable of producing high-precision resin-sealed products.

DESCRIPTION OF EMBODIMENTS

Referring to the accompanying drawings, preferred embodiments of the present invention will be described. In each figure, the same reference sign denotes the same or similar configurations. An embodiment of the present invention is a method for resin-sealing electronic components such as semiconductor chips using a mold-clamping apparatus 1 provided with a plurality of raising-lowering mechanisms (10A, 10B . . . ) including a first raising-lowering mechanism 10A and a second raising-lowering mechanism 10B. The resin-sealing may be compression molding or transfer molding. The present invention will be described in detail below with reference to the drawings.

Figure 1:
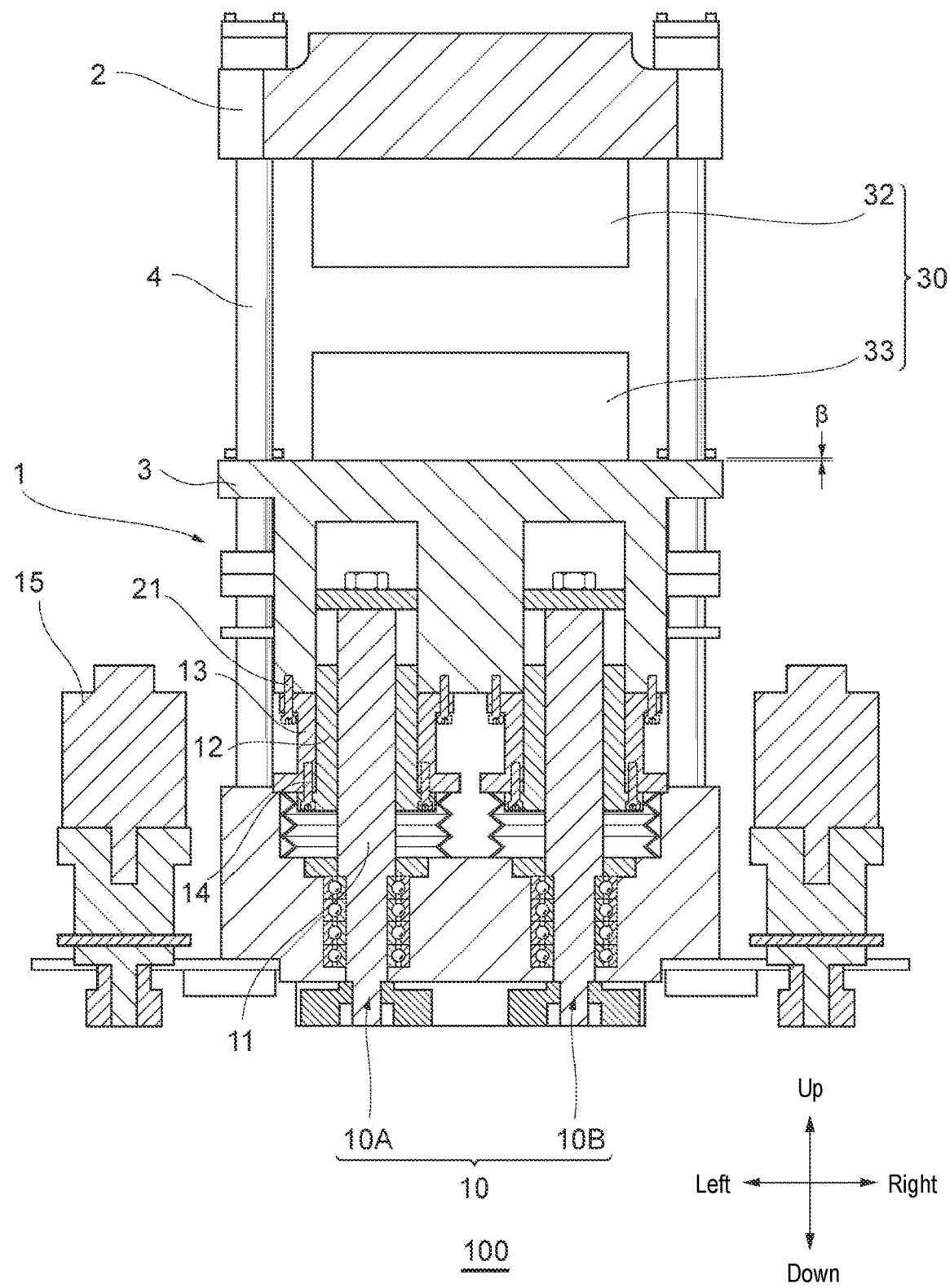
FIG. 1 is a cross-sectional view showing an example of a resin-sealing apparatus used in a resin-sealing method according to an embodiment of the present invention.

FIG. 1 is a cross-sectional view showing an example of a resin-sealing apparatus 100 used in a resin-sealing method according to an embodiment of the present invention, and is a cross-sectional view cut along a plane passing through centers of shaft parts 11 of the first raising-lowering mechanism 10A and the second raising-lowering mechanism 10B (to be described later). As shown in FIG. 1, the resin-sealing apparatus 100 includes a mold-clamping apparatus 1 and a mold 30 detachably attached to the mold-clamping apparatus 1.

The mold-clamping apparatus 1 includes a tie bar 4 in a cylindrical shape extending in an up-down direction, a fixed platen (also referred to as a "fixed plate") 2 fixed to an end part of the tie bar 4, a movable platen (also referred to as a "movable plate") 3 that moves in the up-down direction along the tie bar 4, and a drive mechanism 10 that moves the movable platen 3 in the up-down direction. The mold 30 is composed of an upper mold 32 and a lower mold 33. In the illustrated example, the upper mold 32 is attached to the fixed platen 2, and the lower mold 33 is attached to the movable platen 3.

The drive mechanism 10 is composed of a plurality of raising-lowering mechanisms (10A, 10B, . . . ) including the first raising-lowering mechanism 10A and the second raising-lowering mechanism 10B. In the illustrated example, the fixed platen 2 is arranged on the upper side and the movable platen 3 is arranged on the lower side, but the fixed platen 2 may also be arranged on the lower side and the movable platen 3 may also be arranged on the upper side. Each of the raising-lowering mechanisms 10A, 10B, . . . is composed of, for example, a ball screw (11, 12, 13, 14), a motor 15, a transmission mechanism (not shown), etc.

Although not shown, the transmission mechanism is composed of, for example, a reduction gear, a belt, a pulley, etc. The ball screw is composed of a shaft part 11, a nut 12, a ring 13, a tightening screw 14, etc. The shaft part 11 extends parallel to an extending direction of the tie bar 4 and is rotationally driven by the servo-controlled motor 15 via the transmission mechanism. Upon rotation of the shaft part 11, the nut 12 undergoes linear motion in the up-down direction. A lower end part of the ring 13 is fixed to the nut 12 with a plurality of tightening screws 14. An upper end part of the ring 13 is fixed to the movable platen 3 with a plurality of tightening screws 21. A free shank structure may connect between the ring 13 and the movable platen 3.

The mold-clamping apparatus 1 is capable of moving the movable platen 3 with a height difference β such that a first part 3A (shown in FIG. 2) corresponding to the first raising-lowering mechanism 10A is at a higher position or a lower position than a second part 3B (shown in FIG. 2) corresponding to the second raising-lowering mechanism 10B. The plurality of raising-lowering mechanisms (10A, 10B . . . ) which cooperate to move the movable platen 3 in the up-down direction are collectively referred to as the drive mechanism 10.

Figure 2:
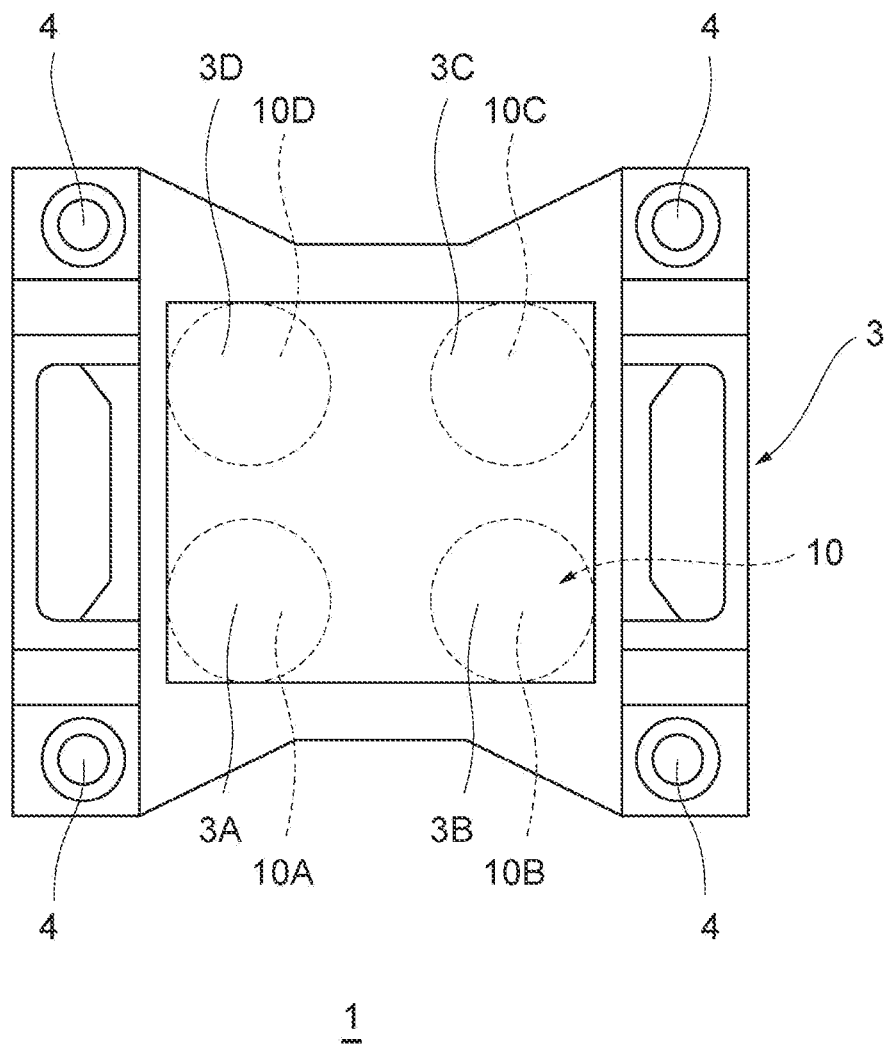
FIG. 2 is a plan view schematically showing a movable platen shown in FIG. 1.

FIG. 2 is a plan view schematically showing the movable platen 3 shown in FIG. 1. In the illustrated example, the drive mechanism 10 of the mold-clamping apparatus 1 includes four raising-lowering mechanisms 10A, 10B, 10C, and 10D. The drive mechanism 10 may also be composed of three or fewer raising-lowering mechanisms or five or more raising-lowering mechanisms. Each of the raising-lowering mechanisms 10A. 10B, 10C, and 10D presses a corresponding part 3A, 3B, 3C, or 3D located directly above the respective raising-lowering mechanism.

A plurality of raising-lowering mechanisms may be combined to tilt the movable platen in various directions. For example, viewed from the front of the resin-sealing apparatus 100 operated by an operator, the movable platen may be tilted upward on the left by raising the raising-lowering mechanisms on the left-front and left-rear sides more than the other raising-lowering mechanisms, or the movable platen may be tilted upward on the front by raising the raising-lowering mechanisms on the left-front and right-front sides more than the other raising-lowering mechanisms.

In the illustrated example, the first raising-lowering mechanism 10A and the second raising-lowering mechanism 10B among the first to fourth raising-lowering mechanisms 10A, 10B, 10C, and 10D are arranged in the left-right direction when viewed from the front, but the first raising-lowering mechanism 10A and the second raising-lowering mechanism 10B may also be arranged in the front-rear direction, or the first raising-lowering mechanism 10A and the second raising-lowering mechanism 10B may also be arranged diagonally (i.e., along a diagonal of the substantially rectangular movable platen 3). In other words, the height difference β between the first part 3A and the second part 3B of the movable platen 3 described in the present invention is not limited to the left-right height difference in the movable platen 3 as illustrated, but may also be a front-rear height difference not shown or a diagonal height difference not shown.

Figure 3:
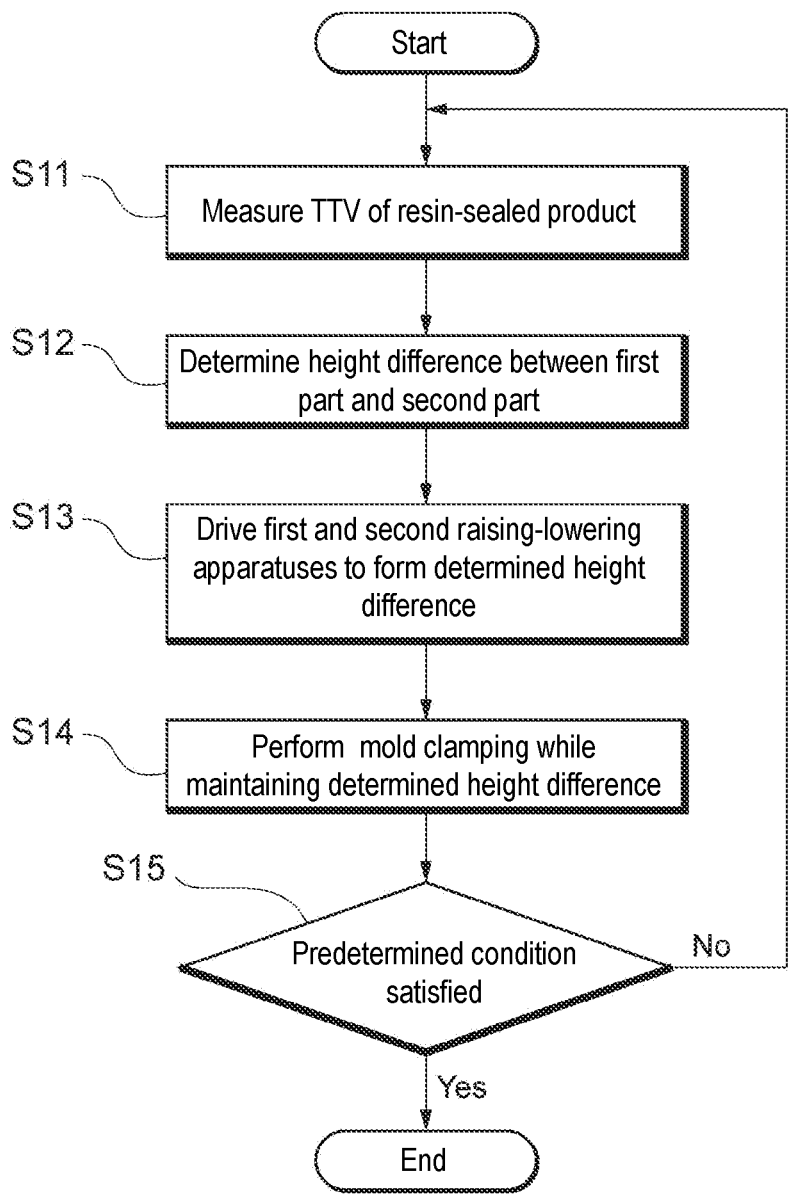
FIG. 3 is a flowchart illustrating an example of a resin-sealing method according to an embodiment of the present invention.

FIG. 3 is a flowchart illustrating an example of a resin-sealing method according to an embodiment of the present invention. In this resin-sealing method, a resin-seal product obtained by resin-sealing is measured to measure a total thickness variation (TTV), which is a difference between a maximum value and a minimum value of the thickness (step S11). Then, to reduce the TTV, a height difference β between the first part 3A and the second part 3B is determined (step S12).

More specifically, in step S12, a first thickness of the resin-sealed product resin-sealed at a position corresponding to the first part 3A is compared with a second thickness of the resin-sealed product resin-sealed at a position corresponding to the second part 3B. In the resin-sealed product, the position corresponding to the first part 3A of the movable platen 3 is, for example, the position directly above the first part 3A, and the position of the resin-sealed product corresponding to the second part 3B is, for example, the position directly above the second part 3B.

Contrary to the illustrated example in FIG. 1, in the case where the fixed platen 2 is on the lower side and the movable platen 3 is on the upper side, the position corresponding to the first part 3A may be the position directly below the first part 3A, and the position corresponding to the second part 3B may be the position directly below the second part 3B.

For example, when a first thickness t1 is larger than a second thickness t2 by a first difference (t1−t2), the first thickness t1 may be reduced to eliminate the first difference (t1−t2), or the second thickness t2 may be increased to eliminate the first difference (t1−t2). Also, the first thickness t1 may be reduced and the second thickness t2 may be increased to eliminate the first difference (t1−t2).

To reduce the first thickness t1, for example, input is performed on the mold-clamping apparatus 1 to determine the height difference β such that a movement amount of the mold clamping performed by the first raising-lowering mechanism 10A increases by the first difference (t1−t2) at the first part 3A. The method of inputting to the mold-clamping apparatus 1 may be manual input of an operation panel or the like by the operator, or automatic input by communication with a measuring apparatus or the like.

To increase the second thickness t2, for example, input may be performed to determine the height difference β such that a movement amount of the mold clamping performed by the second raising-lowering mechanism 10B decreases by the first difference (t1−t2) at the second part 3B. Alternatively, the height difference β may also be determined such that the movement amount of the mold clamping increases by x, which is a portion of the first difference (t1−t2), at the first part 3A, and the movement amount of the mold clamping decreases by (t1−t2−x), which is a remainder of the first difference (t1−t2), at the second part 3B. A height difference with which the TTV becomes smaller can be determined by a simple procedure based on the difference in the thicknesses t1 and t2.

Once the height difference β is determined in this manner, the mold-clamping apparatus 1 drives the first raising-lowering mechanism 10A and the second raising-lowering mechanism 10B such that the first part 3A and the second part 3B form the determined height difference β (step S13). Furthermore, mold clamping is performed in a state maintaining the height difference β (step S14). The resin-sealed product obtained by resin-sealing is removed from the mold 30 and the TTV is measured (step S11), and a flatness of the resin-sealed product is evaluated.

Steps S11 to S14 may be repeated until a predetermined condition satisfied (step S15: No). Satisfying the predetermined condition may mean that the variation amount of the TTV, which decreases gradually, stabilizes at or below a threshold, may mean that the TTV becomes at or below a threshold that is tolerable in terms of quality, or may mean that regardless of the TTV, the count of tests reaches a specified count determined in advance. When the predetermined condition is satisfied (step S15: Yes), the procedure shown in FIG. 3 ends.

Figure 4:
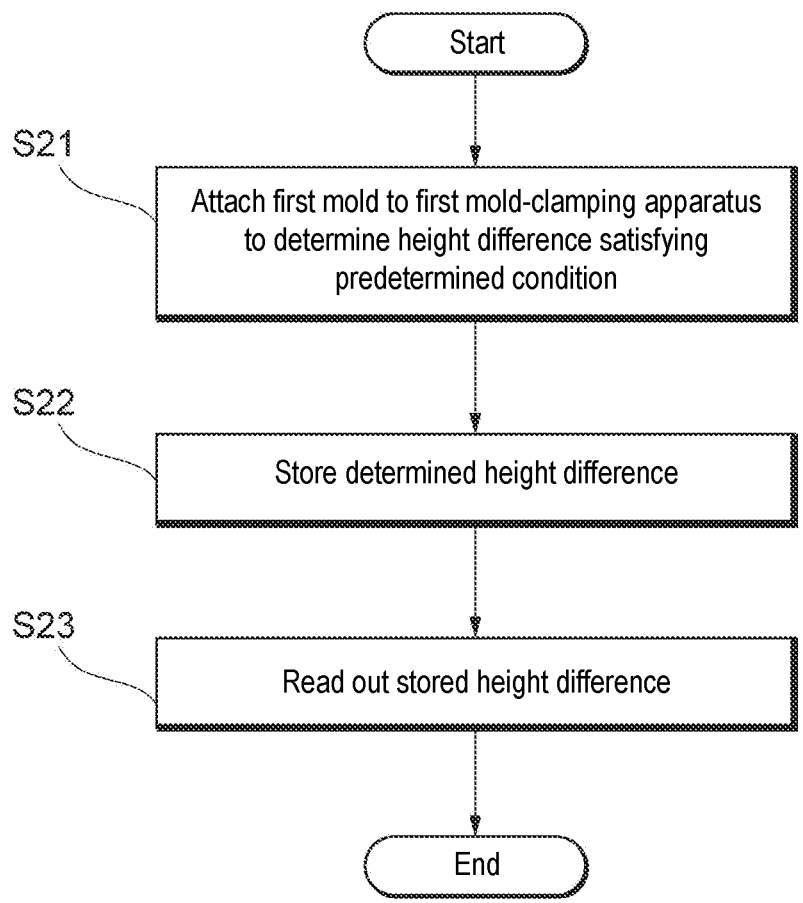
FIG. 4 is a flowchart illustrating another example of the resin-sealing method according to an embodiment of the present invention.

FIG. 4 is a flowchart illustrating another example of the resin-sealing method according to an embodiment of the present invention. In addition to the procedure shown in FIG. 3, the procedure shown in FIG. 4 further includes a procedure for saving the labor required for mold exchange. In the procedure shown in FIG. 4, first, steps S11 to S14 shown in FIG. 3 are repeated in a state in which the mold 30 (an example of a "first mold") is attached to the mold-clamping apparatus 1 to determine a height difference β that satisfies the predetermined condition (step S21).

The determined height difference β satisfying the predetermined condition is stored (step S22). It may be stored to a memory part built in the mold-clamping apparatus 1, may be stored to an external device communicable with the mold-clamping apparatus 1, or may be stored to a storage medium portable and removable from the mold-clamping apparatus 1. In the case where the mold-clamping apparatus 1 has an apparatus ID unique to the apparatus and the mold 30 has a mold ID unique to the mold, the height difference β may be stored in association with the combination of the apparatus ID and the mold ID.

Then, when the mold 30 is attached again to the mold-clamping apparatus 1, the stored height difference β is read out to reproduce the height difference satisfying the predetermined condition (step S23). At this time, by collating the combination of the apparatus ID and the mold ID, the height difference β associated with this combination may be read out. The labor required for mold exchange is saved, and the procedure shown in FIG. 4 ends.

The resin-sealing method of steps S11 to S14 shown in FIG. 3 does not feed the detected values detected during the operation of the mold-clamping apparatus 1 in real time back to the control of the plurality of raising-lowering mechanisms 10A, 10B, . . . , but feeds back the measured values obtained by measuring the resin-sealed product after the operation of the mold-clamping apparatus 1 to reflect to the settings of the plurality of raising-lowering mechanisms 10A, 10B, . . . . Thus, it is less likely to include errors due to disturbances in the adjustment of the height difference β in the movable platen 3. According to the resin-sealing method of steps S11 to S14 shown in FIG. 3, high-precision resin-sealed products with a small TTV can be produced at any installation location.

Furthermore, according to the resin-sealing method of steps S21 to S23 shown in FIG. 4, it is not required to repeat tests and insert a shim at each mold exchange to adjust the mold, or repeat tests to determine the height difference of the movable platen. Since the height difference associated with the combination of the apparatus ID and the mold ID is automatically read out at the time of mold exchange, it is possible to reduce the burden of the operator compared to the case of operating the operation panel or the like to manually read out the value. It is possible to prevent occurrence of human errors resulting from the operator's operation.

The embodiments described above are intended to facilitate understanding of the present invention and are not intended to restrictively interpret the present invention. Each element provided in the embodiments as well as their arrangements, materials, conditions, shapes, and sizes may be appropriately changed and are not limited to those illustrated. Also, it is possible to regionally replace or combine configurations shown in different embodiments.

The invention claimed is:

1. A resin-sealing method, which is a method for resin-sealing an electronic component using a mold-clamping apparatus comprising a plurality of raising-lowering mechanisms including a first raising-lowering mechanism and a second raising-lowering mechanism, the resin-sealing method comprising:
   measuring a resin-sealed product obtained by resin-sealing to measure a total thickness variation which is a difference between a maximum value and a minimum value of a thickness;
   determining a height difference between a first part of a movable platen corresponding to the first raising-lowering mechanism and a second part of the movable platen corresponding to the second raising-lowering mechanism such that the total thickness variation becomes smaller;
   driving the first raising-lowering mechanism and the second raising-lowering mechanism such that the first part and the second part form the height difference; and
   performing mold clamping in a state maintaining the height difference.

2. The resin-sealing method according to claim 1, wherein in the determining the height difference,
   comparing a first thickness of the resin-sealed product resin-sealed at a position corresponding to the first part with a second thickness of the resin-sealed product resin-sealed at a position corresponding to the second part, in a case where the first thickness is larger than the second thickness by a first difference,
   the height difference is determined such that a movement amount of mold clamping increases by the first difference at the first part,
   the height difference is determined such that a movement amount of mold clamping decreases by the first difference at the second part, or
   the height difference is determined such that a movement amount of mold clamping increases by a portion of the first difference at the first part, and a movement amount of mold clamping decreases by a remainder of the first difference at the second part.

3. The resin-sealing method according to claim 1, wherein the measuring the total thickness variation, the determining the height difference, the driving, and the performing mold clamping in a state maintaining the height difference are repeated until a predetermined condition is satisfied.

4. The resin-sealing method according to claim 3, further comprising:
   determining the height difference that satisfies the predetermined condition in a state in which a first mold is attached to the mold-clamping apparatus;
   storing the height difference satisfying the predetermined condition; and
   reading out the stored height difference in a case where the first mold is attached again to the mold-clamping apparatus.

5. The resin-sealing method according to claim 4, wherein the mold-clamping apparatus has an apparatus ID unique to the apparatus, and the first mold has a mold ID unique to the mold, and
   in a case where the first mold is attached again to the mold-clamping apparatus, by collating a combination of the apparatus ID and the mold ID, the height difference associated with the combination is read out.

6. The resin-sealing method according to claim 1, wherein the mold-clamping apparatus comprises four raising-lowering mechanisms including the first raising-lowering mechanism and the second raising-lowering mechanism.

* * * * *